M. SZARKA.
HORSESHOE.
APPLICATION FILED JUNE 10, 1914.
1,123,953.
Patented Jan. 5, 1915.
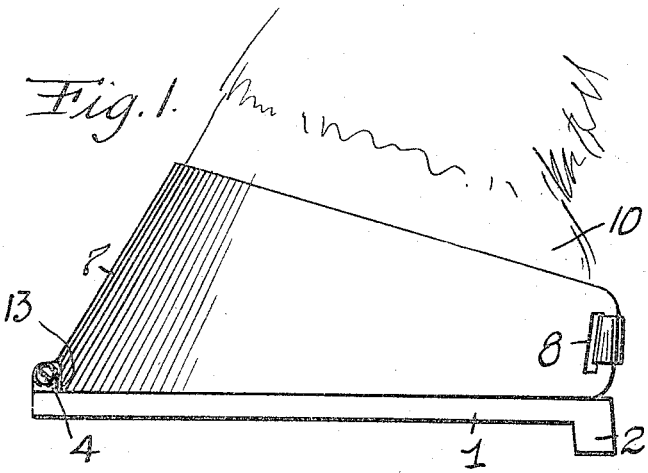
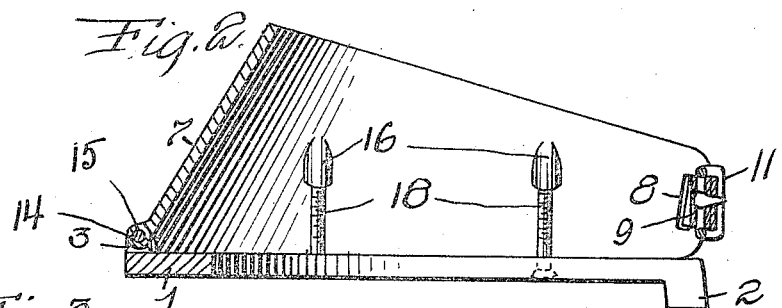
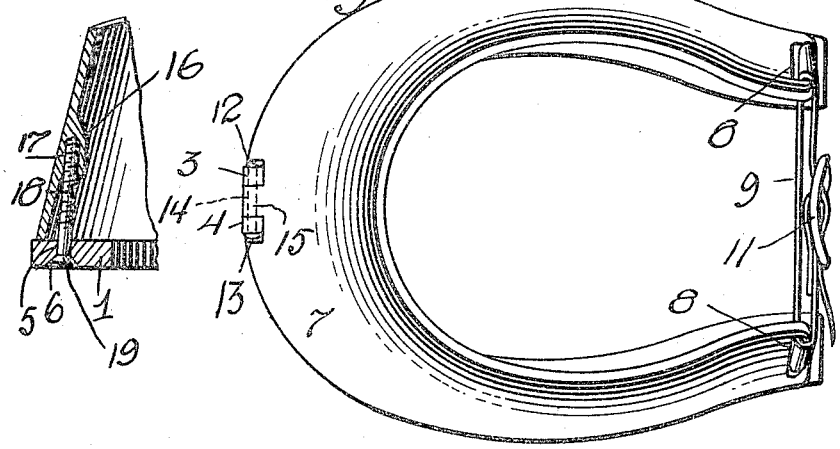
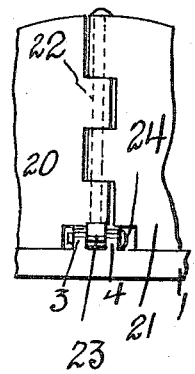
WITNESSES
Samuel Payne.
Max H. Axolenty
INVENTOR
M. Szarka.
By Henry C. Evert
ATTORNEY

UNITED STATES PATENT OFFICE.

MIKHÁEL SZARKA, OF PERTH AMBOY, NEW JERSEY, ASSIGNOR OF ONE-HALF TO MIHALY DUDAS, OF PERTH AMBOY, NEW JERSEY.

HORSESHOE.

1,123,953.  Specification of Letters Patent.  Patented Jan. 5, 1915.

Application filed June 10, 1914. Serial No. 844,298.

*To all whom it may concern:*

Be it known that I, MIKHÁEL SZARKA, a subject of the King of Hungary, residing at Perth Amboy, in the county of Middlesex and State of New Jersey, have invented certain new and useful Improvements in Horseshoes, of which the following is a specification, reference being had therein to the accompanying drawing.

This invention relates to horseshoes, and has for its object to provide a shoe of such class, with means in a manner as hereinafter set forth, for detachably connecting the shoe to the hoof of an animal without necessitating the employment of the ordinary horseshoe nails which extend up through the shoe and engage in the animal's hoof.

A further object of the invention is to provide a horse shoe including means for detachably securing the shoe to the hoof of an animal without injuring the hoof, and to further provide a shoe for the purpose set forth, and which is simple in its construction, readily attached, strong, durable, efficient in its use, and comparatively inexpensive to manufacture.

With the foregoing and other objects in view, the invention consists of the novel construction, combination and arrangement of parts as hereinafter more specifically described and illustrated in the accompanying drawings, wherein is shown an embodiment of the invention, but it is to be understood that changes, variations and modifications can be resorted to which come within the scope of the claims hereunto appended.

In the drawings wherein like reference characters denote corresponding parts throughout the several views:—Figure 1 is a side elevation of a horse's hoof showing the adaptation therewith of a horse shoe in accordance with this invention, Fig. 2 is a sectional elevation of the shoe, Fig. 3 is a detail in vertical section, Fig. 4 is a top plan, and Fig. 5 is an elevation, broken away, of a modified form.

Referring to the drawings in detail, 1 denotes a body portion of the shoe, having heel calks 2, and further having at the toe thereof a pair of vertically disposed spaced lugs 3, 4. The body portion 1 of the shoe is formed at each side with upwardly extending openings 5, which incline slightly toward the rear of said body portion and the lower face of the body portion 1 has countersinks 6, which register with the openings 5.

Associated with the body portion 1 is an attaching means therefor and which as illustrated in Figs. 1 to 4 consists of a retaining member 7, conforming in contour to the shape of the body portion 1, and inclining inwardly in vertical section. The member 7 is formed of one piece of material and extends from the toe to the heels of the shoe, and has each of its ends provided with slots 8, for the purpose of connecting to said member 7, a coupling strap 9, which is employed for connecting the ends 8 together and for further detachably securing the member 7 to the hoof 10 of the animal. The strap extends transversely of the rear of the hoof and has means as at 11, to permit of adjusting the length thereof, when occasion so requires.

The toe portion of the member 7 is provided with a pair of notches 12 and 13, to provide clearances for the lugs 3, 4, and that part of the material of the member 7, between the notches 12 and 13 is formed with an opening 14, for the passage of a pivot pin 15, the latter extending through the lugs 3 and 4 and constituting means for pivotally connecting the toe portion of the member 7 to the body portion 1 at the toe of the latter.

The inner face of the member 7 at each side is provided with inset portions 16, which are formed with vertically disposed sockets 17 having threaded walls. Extending up through the openings 5 are rearwardly inclined threaded holdfast devices 18, which engage the threaded wall of the socket 17, for securing said member 7 to the body portion 1. The heads 19 of the holdfast devices 18 are positioned in the countersinks 6, under such conditions that the said heads do not project from the lower face of the body portion 1.

In the modified form shown in Fig. 5, the retaining member is not formed of one piece, but of two sections 20 and 21 which are pivotally connected as at 22. The section 21 is provided with a depending ear 23, which extends between the lugs 3, 4, of the body portion 1, and the said ear 23 is pivotally connected with the lugs 3, 4, by the pivot pin 24.

What I claim is:—

1. A horse shoe comprising a body portion, a retaining member adapted to extend around the hoof of an animal and having its forward portion pivotally connected to said body portion, inclined holdfast devices extending up through said body portion and engaging in said member for connecting it to said body portion, and an adjustable means for connecting the ends of said retaining member together.

2. A horse shoe comprising a body portion, a retaining member adapted to extend around the hoof of an animal and having its forward portion pivotally connected to said body portion, inclined holdfast devices extending up through said body portion and engaging in said member for connecting it to said body portion, and an adjustable means for connecting the ends of said retaining member together, said retaining member being capable of snugly engaging the hoof of the animal and gradually increasing in height from front to rear.

3. A horse shoe comprising a body portion having the side thereof formed with upwardly extending and rearwardly inclined openings, a retaining member having the forward portion thereof connected to the toe of said body portion and having its inner face provided with means to constitute threaded sockets, threaded holdfast devices extending up through said openings and engaging in said sockets for securing said retaining member to said body portion, and adjustable means connected with the rear of said retaining member for maintaining the latter upon the hoof of an animal.

In testimony whereof I affix my signature in the presence of two witnesses.

MIKHÁEL SZARKA.

Witnesses:
LEO GOLDBERGER,
ALEXANDER BALINT, Jr.

Copies of this patent may be obtained for five cents each, by addressing the "Commissioner of Patents, Washington, D. C."